United States Patent [19]

Takeda et al.

[11] Patent Number: 4,943,123
[45] Date of Patent: Jul. 24, 1990

[54] BRAKE CONTROL APPARATUS IN DIAGONAL BRAKING HYDRAULIC PRESSURE SUPPLY SYSTEM FOR USE IN MOTOR VEHICLES

[75] Inventors: Kenji Takeda, Okazaki; Sigeru Kamiya, Aichi; Satosi Suzuki; Yasuhisa Yoshino, both of Okazaki, all of Japan

[73] Assignees: Nippondenso Co., Ltd., Kariya; Nippon Soken, Inc., Nishio, both of Japan

[21] Appl. No.: 254,607

[22] Filed: Oct. 7, 1988

[30] Foreign Application Priority Data

Oct. 8, 1987 [JP] Japan .................................. 62-254324

[51] Int. Cl.[5] ........................... B60T 8/26; B60T 8/32
[52] U.S. Cl. .................................. 303/111; 188/181 C; 303/9.62; 303/100; 303/119; 303/115
[58] Field of Search .................... 303/9.62, 9.71, 9.73, 303/9.75, 9.66, 15, 100, 103, 105, 110, 111, 119, 113, 116, 115; 188/181 A, 181 C, 349; 180/197; 364/426.02, 426.03

[56] References Cited

U.S. PATENT DOCUMENTS

| | | | |
|---|---|---|---|
| 3,871,713 | 3/1975 | Lister | 303/113 X |
| 3,980,344 | 9/1976 | Burckhardt | 188/349 X |
| 4,418,966 | 12/1983 | Hattwig | 303/100 |
| 4,505,520 | 3/1985 | Maehara | 188/181 C X |
| 4,547,022 | 10/1985 | Brearley et al. | 303/115 X |
| 4,626,038 | 12/1986 | Hayashi et al. | 303/113 X |
| 4,715,663 | 12/1987 | Hattori et al. | 303/110 |
| 4,804,235 | 2/1989 | Matsumara | 303/9.66 |

FOREIGN PATENT DOCUMENTS

| | | |
|---|---|---|
| 60-47750 | 3/1985 | Japan . |
| 60-53452 | 3/1985 | Japan . |
| 62-47749 | 10/1987 | Japan . |
| 63-240455 | 10/1988 | Japan . |
| 2049080 | 12/1980 | United Kingdom ............... 303/115 |
| 2065251 | 6/1981 | United Kingdom ............... 303/9.62 |

Primary Examiner—Douglas C. Butler
Attorney, Agent, or Firm—Cushman, Darby & Cushman

[57] ABSTRACT

In a braking apparatus for use in a motor vehicle which supplies hydraulic pressure from a master cylinder to wheel braking cylinders for front-side and rear-side wheels, a braking force adjusting device is provided in common between the master cylinder and the front-side and rear-side wheel braking cylinders to adjust the hydraulic pressure to be applied to the front-side and rear-side wheel cylinders. A proportioning valve controls the hydraulic pressure to the rear-side wheel braking cylinder to become lower than the hydraulic pressure from the braking force adjusting device by a predetermined ratio. The proportioning valve is adapted to change the predetermined ratio in accordance with a control signal to prevent the rear-side wheel from locking. The control signal to the proportioning valve is determined on the basis of information representing an excessive degreee of braking force obtained in accordance with the states of the front-side and rear-side wheels during the braking operation.

9 Claims, 8 Drawing Sheets

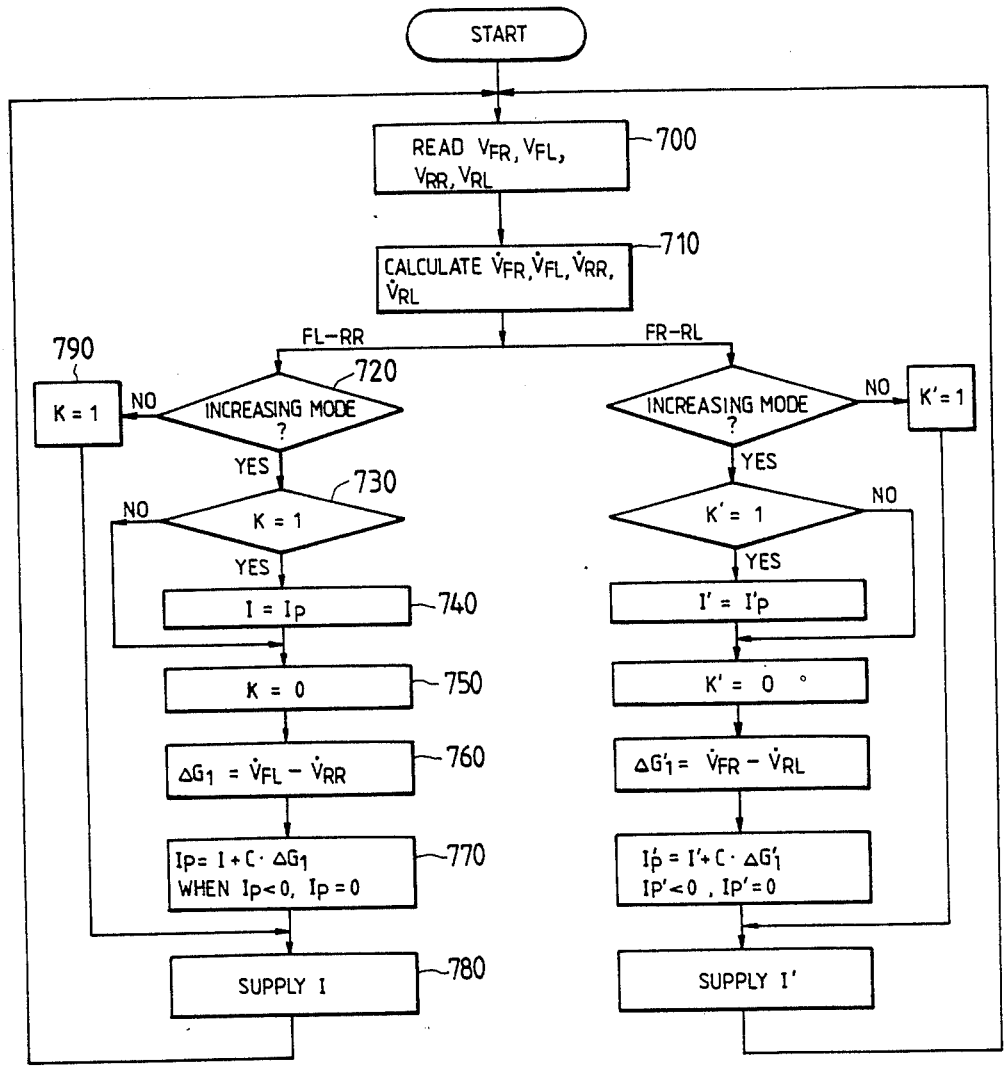

BRAKE CONTROL APPARATUS IN DIAGONAL BRAKING HYDRAULIC PRESSURE SUPPLY SYSTEM FOR USE IN MOTOR VEHICLES

BACKGROUND OF THE INVENTION

The present invention relates generally to a brake control apparatus for use in motor vehicles, and more particularly to a brake control apparatus suitably employed for a diagonal braking hydraulic pressure supply system.

One known braking hydraulic pressure supply systems for braking wheels of a motor vehicle is a diagonal braking hydraulic pressure supply system in which a braking hydraulic pressure generated in the master cylinder and applied through a first hydraulic pressure supply system to the front-left wheel and the rear-right wheel and further applied through a second hydraulic pressure supply system, having the same structure as the first hydraulic pressure supply system, to the front-right wheel and the rear-left wheel. That is, for example, as shown in FIG. 1, a hydraulic pressure generated in a master cylinder 2 in response to depression of a braking pedal of the motor vehicle is supplied through a hydraulic pressure system 100 to a wheel braking cylinder 3a for the front-right wheel FR and a wheel braking cylinder 3d for the rear-left wheel RL and further supplied through another hydraulic pressure system 200 to a wheel braking cylinder 3b for the front-left wheel FL and a wheel braking cylinder 3c for the rear-right wheel RR. Each of the hydraulic pressure systems includes a hydraulic pressure control device 1a or 1b for allowing execution of two-channel anti-skid control, for example, and a proportioning valve 4a or 4b which is provided in a rear-wheel side hydraulic pressure passage.

One important problem in such a braking arrangement relates to the deterioration of travelling stability and increase in braking distance. That is, the proportioning valves 4a and 4b used in the prior art braking arrangement are of the characteristic-fixing type and the characteristics are determined such that the hydraulic pressure distribution between the front and rear side wheels is appropriate when running on a general dried asphalt road surface. For example, in the case of a front-wheel driven (FF) vehicle in which the front wheel has a spike tire and the rear wheel has a normal tire, the pressure in the front-wheel braking cylinder may be required to be more increased in order to shorten the braking distance of the motor vehicle. That is, in FIG. 2, irrespective of having the pressure distribution characteristic indicated by the solid line, the braking hydraulic pressures for the front and rear wheels are determined as a point B. According to conventional proportioning valves, when the braking hydraulic pressure indicated by the point B is applied to the front wheel, the braking hydraulic pressure indicated by a point C is applied to the rear wheel, resulting in a tendency to lock thereby deteriorating the travelling stability. On the other hand, when the braking hydraulic pressure indicated by the point B is applied to the rear wheel, the braking hydraulic pressure indicated by a point A is applied to the front wheel, resulting in a lack of the braking force and thus lengthening the braking distance.

A further problem arising in a two-channel anti-skid control apparatus in such a diagonal hydraulic pressure supply system is that there is no possibility that, if a different friction coefficient exists between the road surfaces for the left and right wheels, the hydraulic pressure in the wheel braking cylinder for the high-friction side wheel is controlled to be higher and the hydraulic pressure in the wheel braking cylinder for the low-friction side wheel is controlled to be lower. More specifically, assuming that the right side wheels are on the high-friction road surface and the left side wheels are on the low-friction road surface, it is preferred that the front-right wheel braking cylinder pressure is controlled to be relatively high and the rear-left wheel braking cylinder pressure is controlled to become relatively low. Furthermore, it is also preferred that the front-left wheel braking cylinder pressure is controlled to become relatively low and the rear-right wheel braking cylinder pressure is controlled to be relatively high (as indicated by a point D in FIG. 2). However, the former, due to the characteristic of the proportioning valve as described above, results in an excessive rear-wheel side braking force or an insufficient front-wheel side braking force, and the latter results in an insufficient braking force of the rear-right wheel when the braking pressure applied to the front-left wheel is set to an appropriate value and an excessive braking force of the front-left wheel, thereby causing the front-left wheel to become locked, when the rear-right wheel pressure is set to an appropriate value (as indicated by a point E in FIG. 2). Therefore, these problems cause difficulty to be encountered to meet the requirements of the appropriate execution of the anti-skid control and the traction control, i.e., wheel slip control, because of being difficult to make an appropriate hydraulic pressure distribution for the front and rear wheels.

SUMMARY OF THE INVENTION

The present invention has been developed in order to remove the above-mentioned drawbacks inherent to the conventional braking systems with a diagonal hydraulic pressure supply arrangement.

It is therefore an object of the present invention to provide a braking control apparatus in a diagonal hydraulic pressure supply brake system which is capable of appropriately effecting the pressure distribution between the front and rear wheels to be suitable for execution of the anti-skid control and the traction control.

According to a feature of the present invention, a braking apparatus for use in a motor vehicle supplies hydraulic pressure from a master cylinder, or another braking pressure source, to wheel braking cylinders for front-side and rear-side wheels through a common braking force adjusting device. Hydraulic pressure to the front-side and rear-side wheel cylinders is adjusted by the common braking force adjusting device and a proportioning valve decreases the hydraulic pressure to the rear-side wheel braking cylinder below the hydraulic pressure from the braking force adjusting device. The proportioning valve is adapted to change the ratio between the hydraulic pressure to the rear-side wheel braking cylinder and the hydraulic pressure from, the braking force adjusting device in accordance with a control signal to prevent locking the rear-side wheels. The control signal to the proportioning valve is determined on the basis of information representing an excessive degree of the braking force thereto which is obtained from the states of the front-side and rear-side wheels made due to the braking operation.

More specifically, in accordance with the present invention, a braking apparatus for use in a motor vehicle having at least one front-side wheel and at least one rear-side wheel, comprises: hydraulic pressure supply passage means provided between a master cylinder of the vehicle for generating a hydraulic pressure in response to operation of a braking pedal of the vehicle and wheel braking cylinders for applying braking forces to the front-side wheel and the rear-side wheel, the hydraulic pressure supply passage means including first to third hydraulic passages so that the hydraulic presure from the master cylinder is supplied through the first hydraulic passage and then reaches the front-side wheel braking cylinder through the second hydraulic passage and the rear-side wheel braking cylinder through the third hydraulic passage; first speed sensor means for sensing a speed of the front-side wheel; second speed sensor means for sensing a speed of the rear-side wheel; hydraulic pressure adjusting means provided in the first hydraulic passage for adjusting the hydraulic pressure to be applied to the front-side and rear-side wheel braking cylinders in accordance with a brake control signal; proportioning valve means provided in the third hydraulic passage for controlling the hydraulic pressure to be applied to the rear-side wheel braking cylinder so as to become lower than the hydraulic pressure supplied from the hydraulic pressure adjusting means in accordance with a predetermined proportional characteristic of the proportioning valve means to have a predetermined ratio to the hydraulic pressure supplied from the hydraulic pressure adjusting means, the proportioning valve means being adapted so as to vary the predetermined proportional characteristic to change the predetermined ratio of the hydraulic pressure to the rear-side wheel braking cylinder to the hydraulic pressure from the hydraulic pressure adjusting means in accordance with a ratio control signal; and control means for supplying said hydraulic pressure adjusting means with the brake control signal determined on the basis of the speeds of the front-side and rear-side wheels sensed by the first and second speed sensor means and supplying the proportioning valve means with the ratio control signal determined as a function of information representing an excessive degree of the hydraulic pressure to the rear-side wheel, braking cylinder which is obtained on the basis of the speeds of the front-side and rear-side wheels sensed by the first and second speed sensor means. For example, the excessive degree representing information is the difference between the most decreased speeds of the front-side and rear-side wheels due to the applications of the hydraulic pressures to the front-side and rear-side wheel cylinders.

BRIEF DESCRIPTION OF THE DRAWINGS

The object and features of the present invention will become more readily apparent from the following detailed description of the preferred embodiments taken in conjunction with the accompanying drawings in which:

FIG. 7 is a flow chart for describing operation executed by an electronic control unit of the FIG. 3 apparatus;

DETAILED DESCRIPTION OF THE INVENTION

Figure 1:
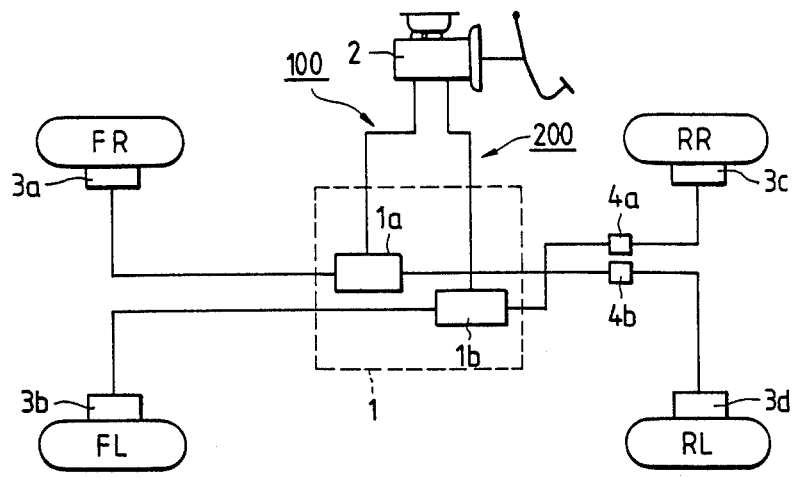
FIG. 1 is a schematic diagram showing a general arrangement of a diagonal braking hydraulic pressure supply system.
Figure 2:
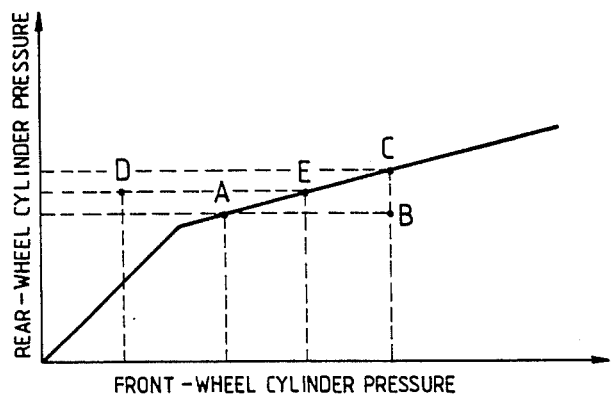
FIG. 2 is a graphic diagram showing a characteristic of a conventional proportioning valve.
Figure 3:
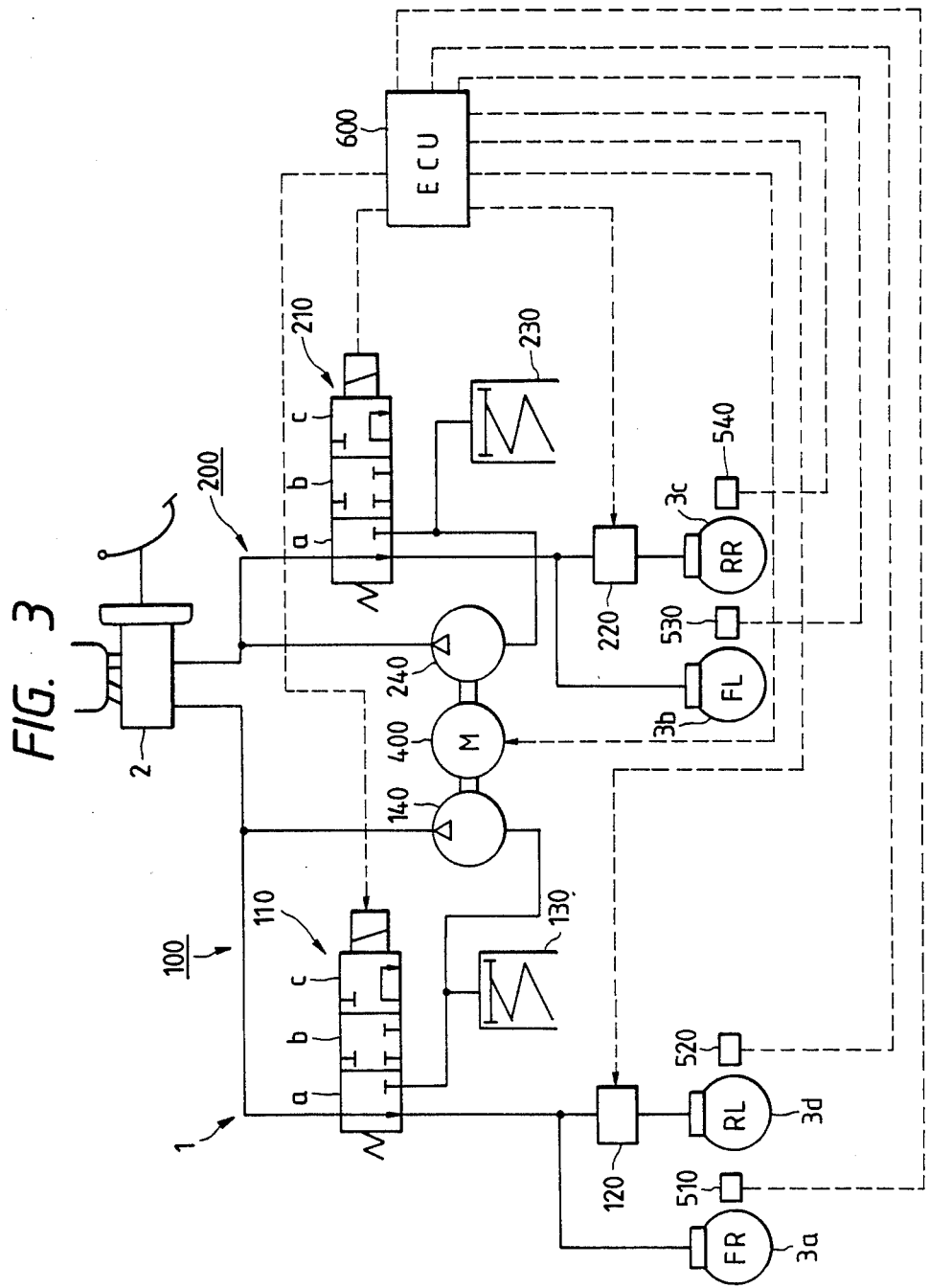
FIG. 3 shows an arrangement of a braking control apparatus according to an embodiment of the present invention.

Referring now to FIG. 3, there is illustrated an arrangement of a brake control apparatus, or an anti-skid control apparatus, according to an embodiment of the present invention which is incorporated into a diagonal braking hydraulic pressure supply system (diagonal hydraulic pressure circuit) for use in a motor vehicle having front side wheels FR, FL and rear side wheels RR, RL. In FIG. 3, master cylinder 2 generates a hydraulic pressure in response to operation of a braking pedal of the motor vehicle. The hydraulic pressure from the master cylinder 2 is supplied to two hydraulic pressure systems designated respectively by numerals 100 and 200. The first hydraulic pressure system 100 is provided in order to supply the hydraulic pressure to wheel braking cylinders 3a and 3d for the front-right wheel FR and the rear-left wheel RL, whereas the second hydraulic pressure system 200 is provided in order to supply the hydraulic pressure to wheel braking cylinders 3b and 3c for the front-left wheel FL and the rear-right wheel RR. Since the first and second hydraulic pressure systems 100 and 200 have the substantially same structure as shown in FIG. 3, the description thereof will be made hereinbelow in terms of only the second hydraulic pressure system 200. The second hydraulic pressure system 200 comprises a solenoid-operated three-position valve 210 (a valve 110 in the first system 100), a proportioning valve 220 (a valve 120 in the first system 100), a reservoir 230 (a reservoir 130 in the first system 100) and a pump 240 (a pump 140 in the first system 100) driven by a common motor 400. The pump 240 is provided between the reservoir 230 and a master cylinder-side hydraulic pressure passage so as to supply a hydraulic pressure from the reservoir 230 to the passage. The three-position valve 210 is arranged to take one of three positions a, b and c illustrated in FIG. 3. When the three-position valve 210 takes the first position a, the hydraulic pressure from the master cylinder 2 is supplied to the wheel braking cylinders 3b and 3c (pressure-increasing mode). When the three-position valve 210 takes the second position b, all the hydraulic pressure passage is cut off (pressure-maintaining mode). When the three-position valve 210 takes the third position c, the hydraulic pressures in the wheel braking cylinders 3b and 3c are released toward the reservoir 230 (pressure-decreasing mode). The operation of the three-position valve 210 is controlled in accordance with a control signal from an electronic control unit (ECU) 600 with a microcomputer comprising a central processing unit (CPU), a random-access memory (RAM), a read-only memory (ROM), and so on (not shown), which is coupled to wheel speed sensors 510 to 540 for sensing the wheel speeds.

Figure 4:
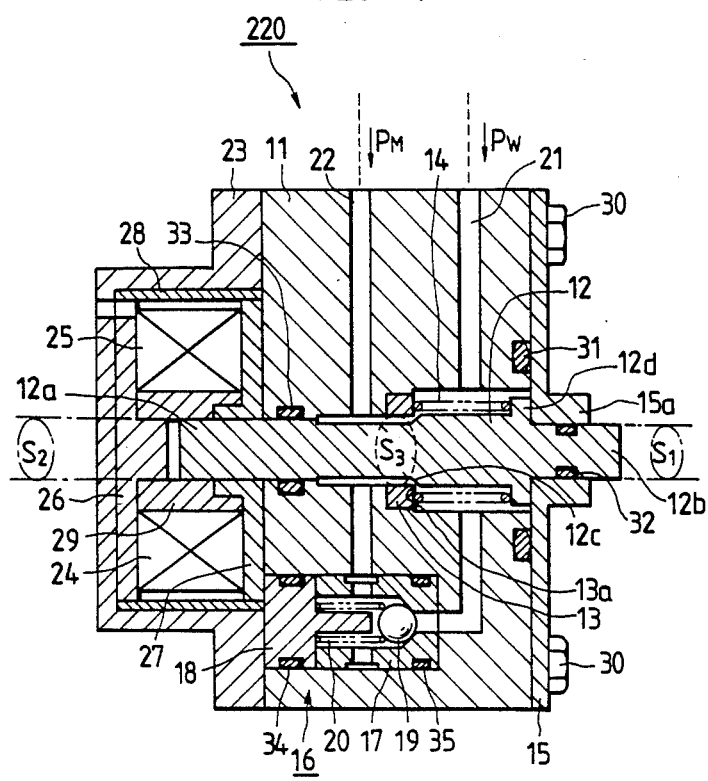
FIG. 4 is a cross-sectional view showing a portioning valve used in the embodiment of this invention.

FIG. 4 is a cross-sectional view showing the proportioning valve 220. In FIG. 4, the proportioning valve 220 has a housing 11 made of a non-magnetic material (for example, aluminium) in which formed successively are two passages 21, 22 and two cylindrical chambers (not designated by reference numerals). A non-mangetic spool 12 is encased in the two cylindrical chambers to be slidable and has at its end portions cylindrical portions 12a and 12b which are coupled through a taper portion 12c and a boss portion 12d to each other. One end surface of each of the cylindrical portions 12a, 12b thereof is released or exposed to the atmosphere, the one end surface of the cylindrical portion 12a (the left end surface, of the spool 12) being communicated through a passage (not shown) with the outside. A seat member 13 is pressure-inserted at the center portion of the cylindrical chamber into the housing 11 and a spring member 14 is provided between the seat member 13 and the boss portion 12d of the spool 12 so that the spool 12 is biased in the right direction in the Figure. Cover 15 is fixedly secured to the housing 11 by means of bolts 30 and has a guide portion 15a for slidably supporting the one end portion 12b of the spool 12.

Further provided in the housing 11 is a check valve 16 comprising a sheet 17, a ball stopper 18, a ball 19 and a spring 20 which is adapted to allow only the flow of liquid from the passage 21 to the passage 22. Other than the housing 11, there is provided a coil housing 23 made of a non-magnetic material which encases therein a coil portion 24 comprising a coil 25, a plate 26, a side plate 27, a ring 28 and a non-magnetic guide 29. The coil housing 23 is integrally secured to the cover 15 and the housing 11 by means of the above-mentioned bolts 30. Numerals 31 to 35 represents O-rings for sealing portions in the proportioning valve 220.

Here, the cylindrical portions 12a and 12b of the spool 12 are at one end surfaces released (protruded) to the atmosphere side and different in cross-sectional area from each other, the cross-sectional areas of the cylindrical portions 12a and 12b being respectively designated by references S2 and S1. In response to movement of the spool 12c in the left direction in the Figure, the taper portion 12 of the spool 12 comes into contact with a corner portion 13a of the seat member 13 to cause the passages 21 and 22 to be cut off respectively. At this time, when the cross-sectional area of the contact point of the taper portion 12c and the corner portion 13a is S3, the relation among S1, S2 and S3 is S1<S2<S3.

Operation of the proportioning valve 220 will be described hereinbelow. In the state that the coil 25 is deenergized, when a pressure applied to the passage 21 is Pw, a pressure applied to the passage 22 is Pm and the biasing force of the spring 14 is Fs, of the forces applied to the spool 12, the force Fr in the right direction in the Figure is equal to Fs and the force Fl in the left direction in the Figure is given by $(S2-S1) \times Pm$. That is, since the right end portion of the spool 12 is protruded to the atmosphere side, the the left-direction force of the spool 12 by the hydraulic pressure can be reduced by a value corresponding to the cross-sectional area S1. By the reduction of the left-direction force, the biasing force Fs of the spring 14 can be made smaller and further the coil portion 24 for generating the suction force in the left direction against the biasing force Fs of the spring 14 can be size-reduced. As a result, in the case of Fr>Fl, the taper portion 12c of the spool 12 and the corner portion 13a of the seat member 13 do not come into contact with each other so that the passages 21 and 22 are respectively in the communicating states, resulting in Pw=Pm. When the pressure Pm is increased to Fs/(S2−S1), the force applied to the spool 12 results in Fr=Fl to cause the taper portion 12c and the corner portion 13a to come into contact with each other. Thereafter, when the pressure Pm is further increased, because of the contact of the taper portion 12c and the corner portion 13a, the right-direction force Fr is given as $Fr=Fs+(S3-S2) \times Pm$ and the left-direction force Fl is given as $Fl=(S3-S1) \times Pw$, resulting in the pressure relationship for satisfying Fr=Fl. That is, $$Fs + (S3 - S2) \times Pm = (S3 - S1) \times Pw$$

$$Pw = \frac{Fs}{S3 - S1} + \frac{S3 - S2}{S3 - S1} Pm$$

Figure 5:
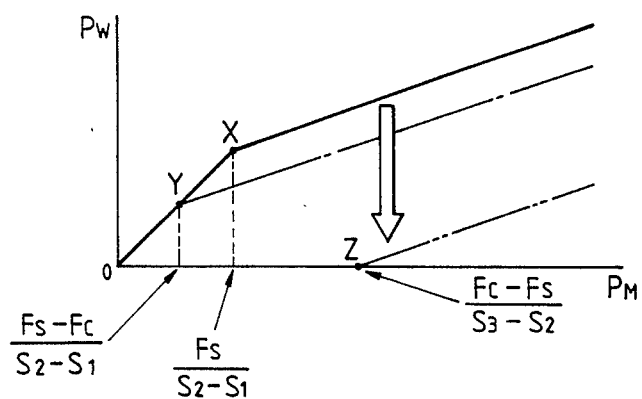
FIG. 5 is a graphic illustration for describing characteristics of the FIG. 4 proportioning valve.

Here, since S3>S2>S1, the value of (S3−S2)/(S3−S1) is smaller than 1 and therefore the increase of the pressure Pw is slow as compared with the pressure Pm. FIG. 5 shows the relationship between the pressures Pw and Pm.

On the other hand, in response to energization of the coil 25, a suction force, Fc is generated in the left direction in the Figure between the spool 12 and the plate 26. This force Fc is determined in accordance with the value of current supplied to the coil 25 and becomes greater as the current value is increased. Thus, because of the generation of the suction force Fc in the left direction due to the energization of the coil 25, the turning point in the characteristic of the porportioning valve 220 is shifted from a X-point (in the case of the deenergization) to a Y-point. In accordance with the increase in the current to the coil 25, the turning point is directed to 0-point and, when Fc>Fs, the taper portion 12c and the corner portion 13a remains in contact with each other even if the pressure Pm is increased to some degree resulting in a constant cutoff of communication between the passages 21 and 22. When the pressure Pm is further increased and exceeds (Fc−Fs)/(S3−S2), the spool 12 is allowed to be moved in the right direction and the pressure Pw is increased in proportion with the increase in the pressure Pm as indicated by a two-dot chain line in FIG. 5.

A description will be made hereinbelow in terms of the anti-skid control based upon the above-mentioned arrangement. The description will be given in the control case giving greater account to the prevention of locking of the rear wheel rather than the front wheel (for example, in the case that the front-side wheel has a spike tire and the-rear-side wheel has a normal tire) (which will be referred hereinafter to as rear-selection control). A feature of this embodiment is that the distribution ratio of the braking forces for the front and rear wheels can be varied in accordance with the current value to the coil 25 of the proportioning valve 220 (or 120), for example, so that a greater braking force is applied to the front-side wheel and a smaller braking force is applied to the rear-side wheel as compared with the case of the conventional apparatus.

Figure 6A:
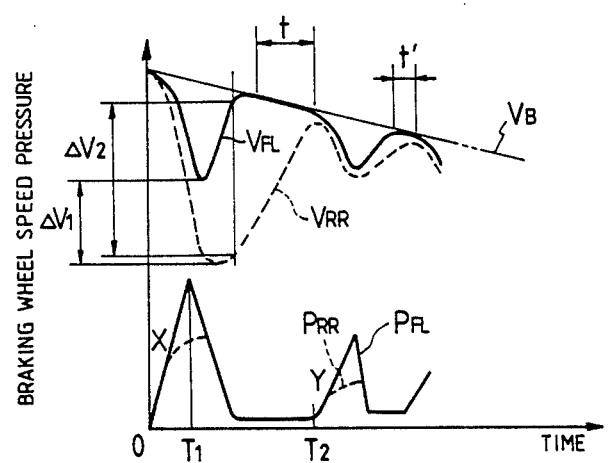
FIGS. 6A, 6B and 6C are graphic diagrams for describing an operation of the FIG. 3 apparatus.
Figure 6B:
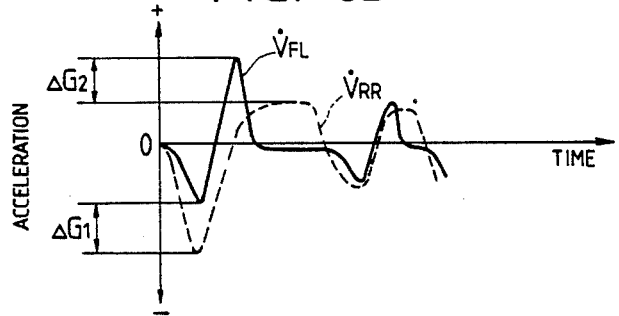
Figure 6C:
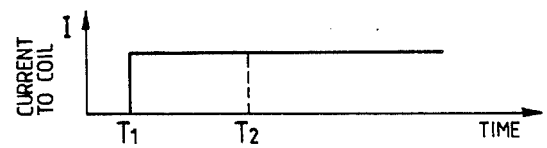

FIGS. 6A to 6C are graphic diagrams showing the state of the motor vehicle under the proportioning valve control. In FIGS. 6A to 6B, reference character $V_B$ represents the speed of the motor vehicle, $V_{FL}$ designates the speed of the front-left wheel FL, $V_{RR}$ depicts the speed of the rear-right wheel RR, $P_{FL}$ represents the pressure in the wheel braking cylinder 3b for the front-left wheel FL, $P_{RR}$ is the pressure in the wheel braking cylinder 3c for the rear-right wheel RR, $V_{FL}$ designates the acceleration of the front-left wheel FL and $V_{RR}$ is the acceleration of the rear-right wheel RR. In response to a braking operation, the respective wheel braking cylinder pressures $P_{FL}$ and $P_{RR}$ are increased whereby the wheel speeds $V_{FL}$ and $V_{RR}$ are decreased (between times 0 and T1). Here, due to the rear-selection control, the electronic control unit 600 outputs a pressure-decreasing command signal to the three-position valve 210 on the basis of the speed and deceleration of the rear-side wheel RR so as to decrease the respective wheel braking cylinder pressures, thereby restoring the respective wheel speeds $V_{FL}$ and $V_{RR}$ (between times T1 and T2). For this time period (between times 0 and T2), as shown in FIGS. 6A and 6B, the decreasing degree of the speed $V_{RR}$ and the deceleration $\bar{V}_{RR}$ of the rear-side wheel RR are greater and the restoring time of the rear-side wheel RR is delayed, as compared with those of the front-side wheel FL. This results in the fact that the rear-side wheel RR has a greater locking tendency in the case of using a normal proportioning valve (whose characteristic has the X-turning point in FIG. 5) and therefore it is required that the pressure distribution be determined so that the turning point is shifted from X to be closer to 0. Here, differences V1, V2, G, and G2 may be used as information representing the excessive amount of the braking force to the rear-side wheel RR to determine the energization amount to the coil 25. The difference $\Delta V1$ represent the speed difference between the maximum, i.e., most, decreased values of front and rear wheel speeds $V_{FL}$ and $V_{RR}$, and the difference $\Delta V2$ represents the speed difference between the front and rear wheel speeds $V_{FL}$ and $V_{RR}$ at the time that the front wheel speed $V_{FL}$ is restored to some degree with respect to the vehicle speed $V_B$. The difference $\Delta G1$ represents the acceleration difference between the front and rear wheel deceleration values $\bar{V}_{FL}$ and $\bar{V}_{RR}$, while difference $\Delta G2$ represents the acceleration difference between the front and rear wheel acceleration values $V_{FL}$ and $V_{RR}$ at the time of the wheel speeds being restored, for example. Thus, the current value to the coil 25 is determined in accordance with at least one of these information values before the next pressure-increasing time. The current value to the coil 25 is set to be greater as the information value becomes greater and this control current I is supplied between times T1 and T2 as shown in FIG. 6C.

FIG. 7 is a flow chart showing the control operation in the case that the information value is $\Delta G1$. In FIG. 7, this operation starts with a step 700 to read the respective wheel speeds $V_{FR}$, $V_{FL}$, $V_{RR}$ and $V_{RL}$, followed by a step 710 to calculate the acceleration values $\dot{V}_{FR}$, $\dot{V}_{FL}$, $\dot{V}_{RR}$ and $\dot{V}_{RL}$ on the basis of the read wheel speeds $V_{FR}$, $V_{FL}$, $V_{RR}$ and $V_{RL}$. Thereafter, control is performed independently for the FL-RR system and FR-RL system. The processes for the FL-RR system and FR-RL system are substantially similar to each other and therefore the description is made with respect to only the FL-RR system. The step 710 is followed by a step 720 to check whether the control is made so that the braking system is in the pressure-increasing mode. If so, control goes to a step 730 and, if not, control goes to a pressure-decreasing-mode step 790. The step 730 is provided to check the control mode variable K. Here, K=1 represents that the control mode is the pressure-decreasing mode and K=0 designates that the control mode is the pressure-increasing mode. If K=1 in the step 730, control advances to a step 740. If K=0, control jumps to a step 750. In the step 740, the control current value Ip calculated at a step 770 (which will be described later) on the previous pressure-increasing is substituted for the current value I to the coil 25 between the time of the present pressure-increasing start and the time of the next pressure-increasing start. In the step 750, the control mode variable K is set to "0". A step 760 follows to calculate the difference $\Delta G1$ between the minimum values of the acceleration values $\bar{V}_{FL}$ and $\bar{V}_{RR}$ of the front-left wheel FL and the rear-right wheel RR, further followed by the step 770 to calculate the next control current value Ip by adding the current value I presently supplied to the coil 25 to a value obtained by multiplying $\Delta G1$ by a constant C. Here, when the current value Ip is negative (when the deceleration of the front-side wheel is greater that that of the rear-side wheel), Ip is set to 0. A step 780 is then executed to supply the current value I to the coil 25 of the proportioning valve 220 only under the condition that the anti-skid control is being performed. On the other hand, in the step 790 the control mode variable k is set to "1" representing that the control mode is the pressure-decreasing mode.

In the above-mentioned operation, the control current value Ip to be supplied to the coil 25 of the proportioning valve 220 at the time of the next pressure-increasing control and pressure-decreasing control is calculated on the basis of the acceleleration difference $\Delta G1$ during the present pressure-increasing control (steps 760, 770), and at the start time of the next pressure-increasing control, the control current value Ip is set to the energization current value I (steps 730, 740). With repetition of these processes, the control can be performed finally with the current value I resulting in $\Delta G1=0$.

When the pressure-increasing control is started from time T2 with the current value I determined thus being supplied to the coil 25, since the turning point is shifted downwardly, the rear-wheel braking cylinder pressure $P_{RR}$ relative to the front-wheel braking cylinder pressure $P_{FL}$ is more decreased as compared with the case of no coil current supply and therefore, as shown in FIG. 6C, the rear wheel does not have a locking tendency, resulting in excellent control. These processes are performed at every time period from the pressure-decreasing to the pressure-increasing so as to result in an appropriate pressure distribution.

Figure 8:
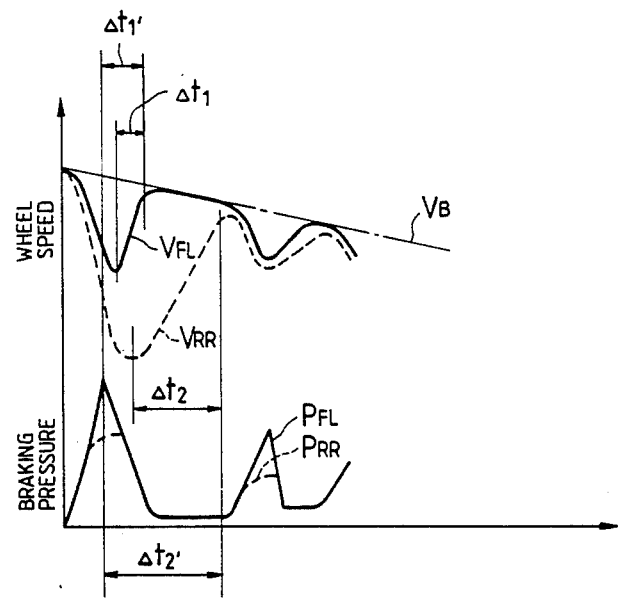
FIGS. 8 and FIGS. 9A, 9B, 9C are graphic illustrations for describing another operation of FIG. 3 apparatus.

Furthermore, it is also appropriate that this control is performed on the basis of the restoring time period of the wheel speed on the pressure-decreasing. That is, as shown in FIG. 8, the restoring time periods of the front and rear wheels are different from each other and therefore the control can be performed on the basis of the difference between the restoring time periods thereof. For example, the current value to the coil 25 may be determined using the difference between the time period $\Delta t1$ taken until the front-wheel speed $V_{FL}$ is restored from the most decreased value up to a predetermined degree and the time period $\Delta t2$ taken until the rear-wheel speed $V_{RR}$ is restored from the most decreased value up to a predetermined degree. In addition, it is also appropriate that the control is effected in accordance with the difference or ratio between the time periods $\Delta t1'$ and $\Delta t2'$ taken until the front and rear wheel speeds are restored from the time of the pressure-decreasing command up to predetermined degrees with respect to the vehicle speed $V_B$.

Thus, the current value control for changing the characteristic of the proportioning valve can be performed on the basis of the above-mentioned information values. Although in the above description the control is performed using the wheel speed difference or wheel acceleration difference, it is also appropriate to use the wheel speed ratio or wheel acceleration ratio. The vehicle speed may be obtained using a vehicle sped sensor such as an acceleration sensor or in accordance with a calculation made on the basis of the non-driven wheel speeds.

Figure 9A:
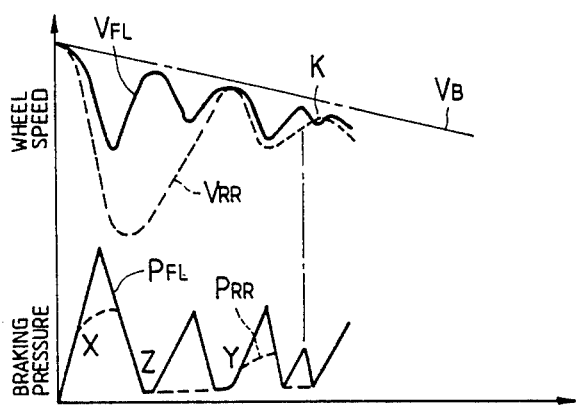
Figure 9B:
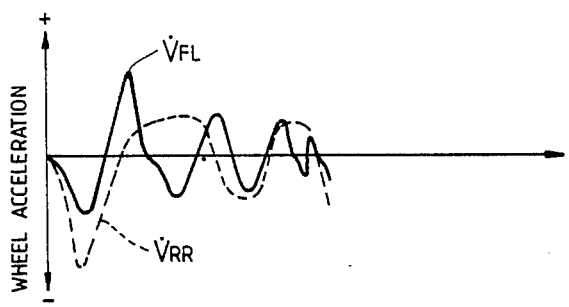
Figure 9C:
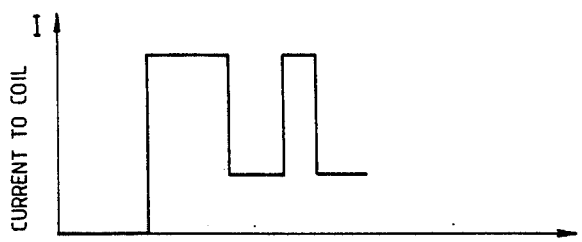

Furthermore, as understood from FIG. 6A, the front-wheel speed $V_{FL}$ is more quickly restored, while the rear-wheel speed $V_{RR}$ takes a considerable long time for restoring. Therefore, it is possible that, taking into account the characteristic indicated by the two-dot chain line in FIG. 5, the braking force is applied to only the front wheel in the course of restoring the rear-wheel speed $V_{RR}$ to further shorten the braking distance. FIGS. 9A to 9C are illustrations for describing one example of this control.

The respective wheel speeds are restored by decreasing the braking pressures in response to the rear-side wheel having a locking tendency and the front-wheel speed $V_{FL}$ is more quickly restored as compared with the rear-wheel speed $V_{RR}$. Generally, it is impossible to perform the pressure-increasing control until the rear-wheel speed $V_{RR}$ is also restored. However, as described above the proportioning valve 220 used in this embodiment can realize the state that the rear-wheel side pressure is not increased irrespective of the pressure-increasing for the front-wheel side with the current value to the coil 25 being set to exceed a predetermined value. Therefore, the pressure-increasing control, can be performed with a great current being applied to the coil 25 so as to independently control only the front-wheel side. Here, due to the rear-selection control, when, for example, the front-wheel speed becomes below the rear-wheel speed (a point illustrated by k in FIG. 9A), the pressure-decreasing may be quickly performed. In the case of applying the presures for both the front and rear wheels, similarly, the control is performed on the basis of the information relating to the wheel speeds and/or wheel accelerations. That is, in response to the requirement to apply the pressure for only the front-wheel side, a relatively great current is supplied to the coil 25, whereas in response to the requirement to apply the pressure for the rear-wheel side the pressure-increasing control is performed with the proportioning valve being operated by an appropriate current value, resulting in improving the control performance.

A second embodiment of this invention for the execution of traction control, i.e, slip control, will be described hereinbelow with reference to FIG. 10 which shows an arrangment of a braking control apparatus incorporated into a braking system for wheels FL and RR and in which parts corresponding to those in FIG. 3 are marked with the same numerals and characters and the description thereof will be omitted for brevity.

Figure 10:
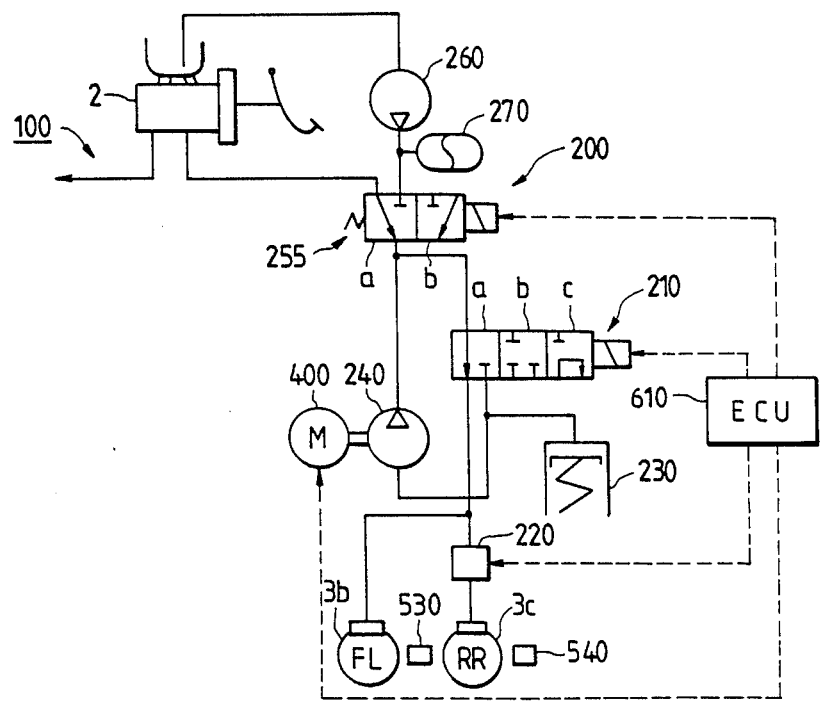
FIG. 10 shows an arrangement of a braking control apparatus according to a further embodiment of this invention.

In FIG. 10, illustrated by numeral 255 is a solenoid-operated two-position valve whose operation is controlled in accordance with a control signal from an electronic cotrol unit (ECU) 610 so as to take a first position a when the apparatus is not in the traction control state so that the hydraulic pressure from a master cylinder 2 is introduced therethrough into the apparatus and to take a second position b on the traction control execution so that a motor-driven pump 260 supplies a braking oil from a reservoir to an accumulator 270 which in turn accumulates a hydraulic pressure up to a predetermined value.

In response to the electronic control unit 610 which determines the execution of the traction control, for example, when the acceleration slipping of the driven wheel exceeds a predetermined value, the electronic control unit 610 controls the two-position valve 250 to take the second position b and supplies to the proportioning valve 220 a current with a value required for realizing the characteristic indicated by the two-dot chain line in FIG. 5. That is, in this embodiment, due to a front-wheel driving (FF) motor vehicle, the excessive degree of the braking force to the rear-side wheel is decided to be maximum from the time of start of the traction control. Thus, the braking pressure is applied to only the master cylinder 3b for the front-left wheel which is a driven wheel. Thereafter, the, traction control is performed by controlling the three-position valve 210 to selectively take the pressure-increasing mode, pressure-decreasing mode and pressure-maintaining mode. Therefore, in the embodiment as shown in FIG. 10, with the proportioning characteristic of the portioning valve 220 being controlled so that the output pressure Pw is not increased irrespective of increase in the input pressure Pm, even in the case of using a braking apparatus in which the front and rear wheels are operated with the same hydraulic pressure system and a hydraulic pressure control mechanism is provided in common for the front and rear wheels, it is possible to apply a braking hydraulic pressure to only the driven wheel, i.e., front-side wheel.

Figure 11:
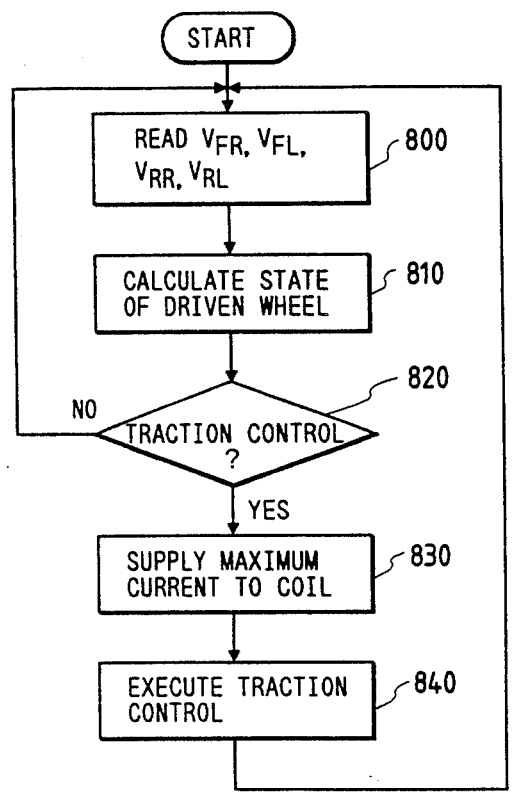
FIG. 11 is a flow chart for describing the operation performed by an electronic control unit of the FIG. 10 apparatus.

FIG. 11 is a flow chart for describing operation in the second embodiment of this invnetion. In FIG. 11, this operation starts with a step 800 to read the respective wheel speeds $V_{FR}$, $V_{FL}$, $V_{RR}$ and $V_{RL}$, then followed by a step 810 to calculate values representing the states of the driven wheels (front-side wheels) such as wheel acceleration value, slip ratio and the difference between the front-side wheel speed and vehicle speed or rear-side wheel speed. Thereafter, a step 820 is executed in order to check the requirement of execution of the traction control on the basis of the these state values If the traction control is required, a step 830 ,follows to supply the maximum current to the proportioning valve 220 and a step 840 is executed to perform the traction control by controlling the two-position valve 250, three-position valve 210 and pumps 240, 260. That is, on the traction control, with the maximum current being supplied to the proportioning valve 220, only the pressure to be applied to the wheel braking cylinder for the driven wheel (front-side wheel) is controlled.

It should be understood that the foregoing relates to only preferred embodiments of the present invention, and that it is intended to cover all changes and modifications of the emboidments of this invnetion herein used for the purposes of the disclosure, which do not constitute departures from the spirit and scope of the invention.

What is claimed is:

1. A brake apparatus for use in a motor vehicle having at least one front-side wheel and at least one rear-side wheel, comprising:

hydraulic pressure supply passage means provided between a master cylinder of said vehicle which generates a hydraulic pressure in response to an operation of a braking pedal of said vehicle and wheel braking cylinders which apply braking forces to said front-side wheel and said rear-side wheel, said hydraulic pressure supply passage means including first to third hydraulic passages such that the hydraulic pressure from said master cylinder is supplied through said first hydraulic passage and then reaches said front-side wheel braking cylinder through said second hydraulic passage and reaches said rear-side wheel braking cylinder through said third hydraulic passage;

first speed sensor means for sensing a speed of said front-side wheel;

second speed sensor means for sensing a speed of said rear-side wheel;

hydraulic pressure adjusting means provided in said first hydraulic passage for adjusting the hydraulic pressure to be applied to said front-side and rear-side wheel braking cylinders in accordance with a brake control signal;

proportioning value means provided in said third hydraulic passage for controlling the hydraulic pressure to be applied to said rear-side wheel braking cylinder in accordance with a predetermined proportional characteristic of said proportioning valve means, said predetermined proportional characteristic being such that the hydraulic pressure applied to said wheel braking cylinder is approximately equal to the hydraulic pressure supplied from said hydraulic pressure adjusting means when the applied hydraulic pressure is below a predetermined pressure value, and the applied hydraulic pressure is less than the hydraulic pressure supplied from said hydraulic pressure adjusting means by a predetermined ratio when said applied hydraulic pressure exceeds said predetermined pressure value, said proportioning value means being adapted to vary said predetermined proportional characteristic to change said predetermined ratio in accordance with a ratio control signal such that said predetermined pressure value is reduced; and electric control means for supplying said hydraulic pressure adjusting means with said brake control signal determined on the basis of the speeds of said front-side and rear-side wheels sensed by said first and second speed sensor means and supplying said proportioning valve means with said ratio control signal determined as a function of information representing an excessive degree of the hydraulic pressure to said rear-side wheel braking cylinder, said information being obtained on the basis of the speeds of said front-side and rear-side wheels sensed by said first and second speed sensor means;

wherein said proportioning valve means comprises:

a housing including therein a spool chamber, a first path connecting said spool chamber to the master cylinder side of said third passage, and a second path connecting said spool chamber to the wheel braking cylinder side of said third passage;

a spool slidably encased in said spool chamber, said spool being biased by spring means in one direction so that said first and second paths are communicated with each other; and electromagnetic coil means responsive to said ratio control signal from said control means for moving said spool in the direction opposite to the biasing direction so as to allow cutting off the communication between said first and second paths.

2. A brake apparatus as claimed in claim 1, wherein one end portion of said spool closer to the electromagnetic coil means is greater in cross-sectional area than the other end portion thereof and both end surfaces of said spool are released to the atmosphere.

3. A brake apparatus for use in a motor vehicle having at least one front-side wheel and at least one rear-side wheel comprising:

a master cylinder for generating a hydraulic pressure in response to an operation of a braking pedal of said vehicle;

wheel braking cylinders for applying braking forces to said front-side wheel and said rear-side wheel;

hydraulic pressure supply passage means provided between said master cylinder and said wheel braking cylinders for supplying hydraulic pressure from said master cylinder through a first passage and a second passage to said front-side wheel braking cylinder and through said first passage and a third passage to said rear-side wheel braking cylinder;

first speed sensor means for sensing a speed of said front-side wheel;

second speed sensor means for sensing a speed of said rear-side wheel;

hydraulic pressure adjusting means provided in said first hydraulic passage for adjusting the hydraulic pressure to be applied to said front-side and rear-side wheel braking cylinders in accordance with a brake control signal;

proportioning valve means provided in one of said second and third hydraulic passages for controlling the hydraulic pressure to be applied to one of said rear-side and said front-side wheel braking cylinders in accordance with a predetermined proportional characteristic of said proportioning valve means, said predetermined proportional characteristic being such that the hydraulic pressure applied to said wheel braking cylinder is approximately equal to the hydraulic pressure supplied from said hydraulic pressure adjusting means when the applied hydraulic pressure is below a predetermined pressure value, and the applied hydraulic pressure is less than the hydraulic pressure supplied from said hydraulic pressure adjusting means by a predetermined ratio when said applied hydraulic pressure exceeds said predetermined pressure value, said proportioning valve means comprising:

a housing including a spool chamber, a first path connecting said spool chamber to the master cylinder side of said third passage, and a second path connecting said spool chamber to the wheel braking cylinder side of said third passage;

a spool slidably encased in said housing chamber;

spring means for biasing said spool in a first direction thereby communicating said first path with said second path;

electromagnetic coil means responsive to a current for moving said spool in a second direction opposite the first direction thereby ceasing communication between said first path and said second path;

wherein said proportioning valve means varies said predetermined proportional characteristic to change said predetermined ratio and reduce said predetermined pressure value in accordance with said current applied to said electromagnetic coil means; and electric control means for supplying said hydraulic pressure adjusting means with said brake control signal determined on the basis of the speed of said front-side and rear-side wheels sensed by said first and second speed sensor means and for supplying said electromagnetic coil means with said current depending upon information representing an excessive degree of the hydraulic pressure to said braking cylinder, said information being obtained on the basis of the speeds of said front-side and rear-side wheels sensed by said first and second speed sensor means.

4. A brake apparatus as claimed in claim 3, wherein said excessive degree representing information is the difference between the most decreased speeds of said front-side and rear-side wheels due to the applications of the hydraulic pressures to said front-side and rear-side wheel cylinders.

5. A brake apparatus as claimed in claim 3, wherein said excessive degree representing information is the difference between the speeds of said front-side and rear-side wheels at the time that the front-side wheel speed decreased due to the application of the hydraulic pressure to said front-side wheel braking cylinder is again increased to a predetermined value due to release of the hydraulic pressure thereto.

6. A brake apparatus as claimed in claim 3, wherein said excessive degree representing information is the difference between the deceleration values of said front-side and rear-side wheels due to the applications of the hydraulic pressures to said front-side and rear-side wheel braking cylinders.

7. A brake apparatus as claimed in claim 3, wherein said excessive degree representing information is the difference between the acceleration values of said front-side and rear-side wheels at the time that the front-side and rear-side wheel speeds decreased due to the applications of the hydraulic pressures to said front-side and rear-side wheel braking cylinders are again increased to predetermined values due to release of the hydraulic pressures thereto.

8. A brake apparatus as claimed in claim 3, wherein one end portion of said spool closer to said electromagnetic coil means is greater in cross-sectional area than the other end portion of said spool, and both end surfaces of said spool are released to the atmosphere.

9. A brake apparatus as claimed in claim 8, wherein said predetermined pressure value is at a first pressure $$(F_s - F_c)/(S_2 - S_1)$$

where $F_s \geqq F_c$, and a second pressure $$(F_c - F_s)/(S_3 - S_2)$$

when $F_c > F_s$, wherein $F_s$ represents a force of said spring means, $F_c$ represents a force of said electromagnetic coil means, $S_3$ represents a cross-sectional area of said spool chamber portion connected to said first path, $S_2$ represents said greater cross-sectional area and $S_1$ represents said smaller cross-sectional area and $S_3 > S_2 > S_1$, said second pressure being only the value at which said predetermined ratio becomes operable under the condition $F_c > F_s$ and not an upper pressure limit of the approximately equal relationship between the hydraulic pressure applied to said wheel braking cylinders and the hydraulic pressure supplied from said master cylinder as the pressure applied to said wheel braking cylinders is approximately zero during the condition $F_c > F_s$ until the pressure supplied from said master cylinder reaches said second pressure.

* * * * *